United States Patent
Armstrong

(10) Patent No.: US 6,279,950 B1
(45) Date of Patent: *Aug. 28, 2001

(54) AXLE CRUTCH

(76) Inventor: Richard E. Armstrong, 5740 Mother Lode Dr., Placerville, CA (US) 95667

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,615

(22) Filed: Dec. 7, 1998

(51) Int. Cl.[7] .............. B60R 27/00; B60G 25/00
(52) U.S. Cl. ............................................. 280/754
(58) Field of Search ..................... 280/754, 86.5; 180/905

(56) References Cited

U.S. PATENT DOCUMENTS

| | | | |
|---|---|---|---|
| 1,421,781 | * 7/1922 | Holmes | 280/754 |
| 2,000,229 | * 5/1935 | Heise | 280/754 |
| 2,454,996 | * 11/1948 | Dahleen | 280/754 |
| 2,459,989 | * 1/1949 | Bobek et al. | 280/754 |
| 3,843,153 | * 10/1974 | Ryan | 280/754 |
| 4,871,183 | 10/1989 | Moss | 280/475 |
| 5,269,593 | 12/1993 | Wasson | 301/130 |

FOREIGN PATENT DOCUMENTS

651514 * 9/1927 (FR) ..................... 280/754

* cited by examiner

Primary Examiner—Robert P. Olszewski
Assistant Examiner—Andrew J. Fischer

(57) ABSTRACT

The invention provides an improved temporary support device for multiple axle trailers with leaf spring suspension regardless of frame design. The device provides emergency towing capabilities to a trailer that would otherwise be immobile due to the failure of a spindle, bearings, spring, tire, suspension, wheel or other suspension or wheel component attached to an axle. The detachable device comprises a steel tube which extends between two leaf spring shackles and is held in place by two locking pins, a length of chain to secure the disabled axle to the steel tube, and a protective shield and locking pin to secure the chain to the steel tube. The steel tube has multiple holes to adjust the device to fit any multiple axle trailer.

8 Claims, 2 Drawing Sheets

AXLE CRUTCH

BACKGROUND

1. Field of Invention

This invention relates to a detachable device for temporarily supporting an axle on a multiple axle trailer with leaf spring style suspension so that said trailer can be moved even when there is a failure to the axle, spindle, bearings, spring, tire, wheel or other suspension or wheel component attached to said axle.

2. Description of Prior Art

When a multiple axle trailer has an axle failure or experiences a failure of a component thereof, the trailer cannot be moved without unloading said trailer and attempting to move it with an elaborate and expensive towing vehicle. Furthermore, repairing the said failure on location at the time said failure occurs can be an expensive and time consuming venture. The present invention attempts to overcome deficiencies of the prior art by providing for a detachable axle support arranged for temporary attachment to any multiple axle trailer with a leaf spring style suspension to accommodate support and transport of the trailer for subsequent repairs at an adequate and safe location.

The present invention offers a compact, easy to use, durable emergency roadside assistance device for trailer operators, tow truck drivers and anyone else assisting in the mobilization of a disabled multiple axle trailer having a leaf spring style suspension system. The only tool needed to install the present device is a simple automobile jack and the embodied components of the invention. Such design is superior to all prior art in that it does not require elaborate tools to install, takes up very little space and overcomes the necessity of a specific frame type that the prior art relied on for its application.

There have been several attempts by the prior art to provide elaborate, expensive and somewhat technical temporary devices to tow or bandage a disabled trailer but all have their limitations.

First, the axle support device in U.S. Pat. No. 3,843,153 to Ryan, Oct. 22, 1974, has a very limited application. Specifically, this device can only be used on trailers with a "U" style or "I" beam shaped channel design frame. The Ryan device requires a flange or ledge in which to clamp on to. Thus, the Ryan device would be useless on a trailer constructed with the more modern and industry-wide standard square-tube frame design since this style has no flange or ledge. Also, the multitude of various parts which comprise this device adds to the complexity of its use. For example, this device requires several tools, specifically wrenches, to attach, use, and detach the device. Therefore, if the user is without proper tools, mechanical knowledge, or the frame is tubular in design, the Ryan axle support device cannot be installed.

Second, the emergency axle apparatus in U.S. Pat. No. 5,269,593 to Wasson, Dec. 14, 1993, is an elaborate and bulky apparatus with a limited use. To begin with, the Wasson apparatus is virtually a substitute axle in and of itself. It has a complete spindle and wheel assembly which makes the apparatus unique to the single application it is built for. Due to its design specific application, the Wasson device cannot be used interchangeably on vehicles that have varying spindle sizes, axle drop or wheel combinations. Needless to say, the Wasson device cannot be universally applied due to the vast array of spindle, axle, and wheel sizes and designs in the industry. Furthermore, the size of the Wasson device causes it to take up a great amount of space when not in use. Also, this apparatus is limited by design and cannot be used under certain spindle, axle, or wheel related breakdown conditions. For example, conditions of a broken spring or spring component would preclude the use of this device since it requires an operating spring system for its use. Lastly, the multitude of various parts associated with the Wasson apparatus adds to the complexity of its use which requires specific tools to attach, use and detach the support device. A device such as Wasson's is expensive, cost prohibitive and too technical for the average consumer to understand and use.

Finally, U.S. Pat. No. 4,871,183 to Moss; U.S. Pat. No. 4,087,008 to Silva Jr.; and U.S. Pat. No. 3,613,921 to Ryden are all examples of tow dollies for wheeled vehicles as utilized in the prior art to permit the transport of disabled trailers and the like. These designs require attachment to the tow vehicle to move the disabled trailer. Such designs are bulky, expensive, limited in application, and are not feasible as a temporary or an emergency device for the average consumer to carry onboard their towing vehicle. These examples offer a distinct and separate alternative to mobilizing a trailer. And thus, the present invention, the Axle Crutch, offers the operator a distinct alternative to using a tow dolly style device.

OBJECTS AND ADVANTAGES

Accordingly, several objects and advantages of my invention are:

(a) to provide an axle support device that one can install without the using elaborate tools;

(b) to provide a support device that one can install in a short period of time;

(c) to provide a support device that is compact yet durable;

(d) to provide a support device that will allow one to tow a disabled trailer with the usual towing vehicle, and without assistance from a tow truck or other wrecking type vehicle;

(e) to provide a support device that can be universally applied to all multiple axle trailer designs with leaf spring suspension;

(f) to provide a support device that can be carried or stowed in a relatively small space onboard a trailer or tow vehicle;

(g) to provide a support device that is constructed with a simple design;

(h) to provide a support device that is constructed with quality materials, yet light weight; and, (i) to provide a support device that is economical in materials and design.

Further objects and advantages of my invention will become apparent from a consideration of drawings and ensuing description

DRAWING FIGURES

The invention will be better understood and objects other than those set forth above will become apparent when consideration is given to the following detailed description thereof. Such description makes reference to the annexed drawings wherein.

Figure 1:
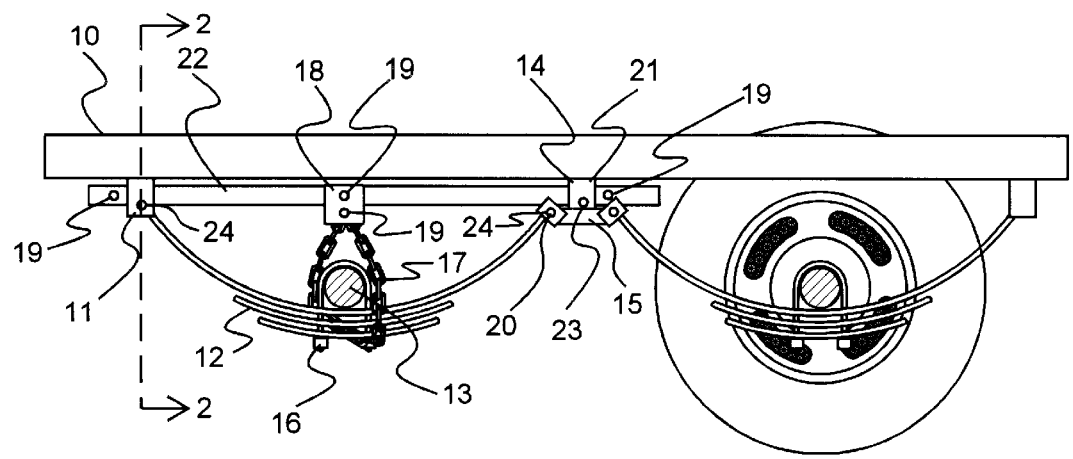
FIG. 1 shows a side view of a typical trailer frame equipped with multiple axles and leaf spring suspension with the axle support device properly installed.

REFERENCES NUMERALS IN DRAWINGS 10 frame
11 spring hanger
12 spring leaf
13 axle tube
14 shackle plate
15 rocker mount
16 "U" bolts
17 chain
18 center support shield
19 pins
20 bolt
21 center spring hanger
22 square tube
23 bolt
24 bolt
25 backing plate
26 brake drum
27 hub
28 wire bail
29 hole
30 hole
31 hole
32 hole
33 hole
34 hole
35 hole

SUMMARY

In accordance with the present invention, the Axle Crutch, a portable device for temporarily supporting an axle on a multiple axle trailer with leaf spring suspension, comprises an elongated rigid body having multiple settings, an adjustable member to attach the device to the vehicle axle, a center support shield which slides over the rigid body, and pin means to secure the device together in various positions.

DESCRIPTION—FIGS. 1 to 6

With reference now to the drawings, and in particular to FIGS. 1 to 6 thereof, a new and improved detachable device for temporarily supporting an axle of a multiple axle trailer embodying the principles and concepts of the present invention will be described.

A portion of a trailer frame with tandem axles and a typical leaf spring suspension is illustrated in FIG. 1. The axles are fastened to the center of the leaf springs by the use of two U- bolts 16 at both ends of the axle. The leaf spring 12 is attached to the frame 10 by means of a bolt 24 passing through a spring hanger 11 and then through the spring 12, the center of the spring 12 is secured to the axle 13 by means of two U-bolts 16 these attaching points prevent the axle 13 from moving fore or aft. The other end of the spring 12 is attached by another bolt 24 which passes through a shackle plate 14 and then through the leaf spring 12 the other end of the shackle plate 14 is connected by another bolt 20 which secures it to the rocker mount 15, the rocker mount 15 is then attached to the center spring hanger 21 by means of a bolt 23. These three mounting points act as pivot points which allows for up and down movement of the leaf springs 12 caused by weight displaced on the trailer and distribution of such weight distributed between the axle assemblies.

The configuration of the frame 10 used on trailers range from boxed or tubular, "I" beam or channel type which limits the use of all prior art to the type of frame that the prior art devices were designed to be attached, specifically those of a channel type. In FIG. 1 the main supporting component of the present invention is the square tube 22 which is shown installed beneath the frame 10 and extending between spring hanger 11 and center spring hanger 21 and is entirely supported by bolts 23 and 24. Because of this unique placement of square tube 22, the present device may be used on any trailer regardless of the frame configuration. Furthermore, the placement of the square tube 22 inside of the spring hangers 11 and 21 applies to any trailer using a leaf spring suspension because of the industry using a standard leaf spring width. The remaining components used in conjunction with this device are the two pins 19 which secure the square tube 22 in place and prevents it from moving fore or aft, the center support shield 18, which is placed over square tube 22 at its middle position and is retained in place by a pin 19, chain 17 is wrapped under the leaf spring 12 and the axle tube 13 then secured to the center support shield 18 by means of a pin 19 inserted through the lower holes 35 (see FIG. 6) of the center support shield 18. The center support 18 is positioned directly over axle tube 13 which is supported in its travel position.

Figure 2:
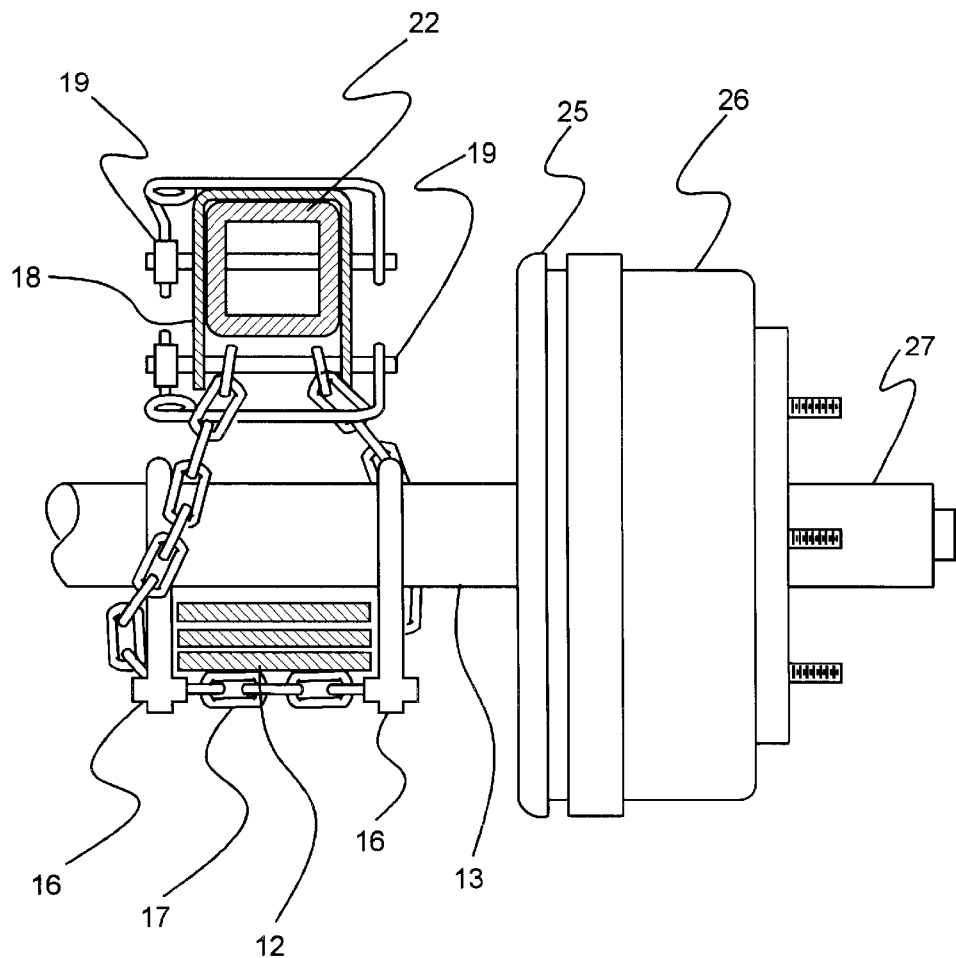
FIG. 2 is a sectional view along lines 2—2 of FIG. 1 as it would be viewed from the front or the rear of the axle with the axle support properly installed.

At each outer end of the axle tube 13 there is a tire and wheel mounted to the hub 27 see FIG. 2 (wheel and tire not shown) the hub 27 contains two wheel bearings, seal and locking nut to secure it to axle tube 13 the hub 27 has a brake drum 26 mounted to it, which provides the inner surface that the brake shoes contact for stopping ability. The brake backing plate 25 is bolted to the axle tube 13 and serves as the mounting for the brake shoes and related components inside of the brake drum 26. A failure to any one of these components including breakage of the leaf spring 12 will prevent the trailer from being moved without further damage to the trailer and posing a danger to others. The present invention described herein will permit the trailer to be mobilized so emergency towing can be continued to a repair facility. The necessary action to be taken to install the device at hand, is the affected axle end 13 is lifted by any ordinary automobile jack, the wheel and tire are removed, and then the axle 13 is positioned at is appropriate traveling height and the device is installed as shown in FIG. 2 which illustrates the center attaching components as they are to be installed to support the axle 13 in a fixed position and the trailer is then ready to be towed to a repair facility or off of a dangerous highway.

Figure 3:
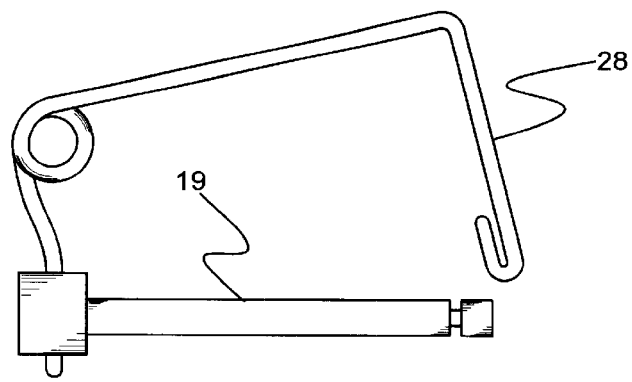
FIG. 3 shows the type of pins used with the axle crutch with a latch device to keep them properly secured.
Figure 5:
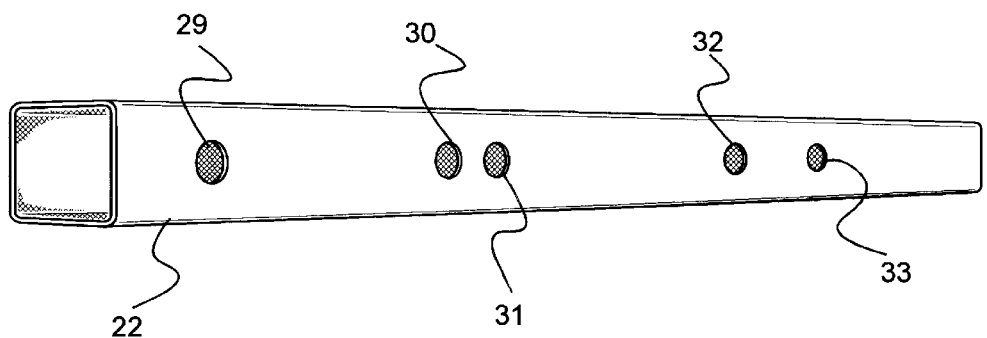
FIG. 5 shows the square tube which is used to support the weight of the axle assembly when properly installed including the holes which provide multiple settings for universal application.
Figure 6:
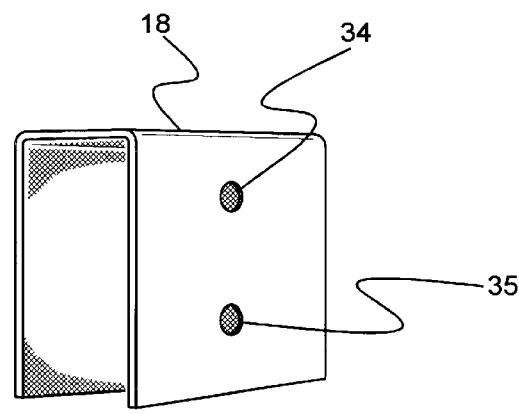
FIG. 6 shows the "U" shaped center shield support which connects the chain to the square tube and protects the pin hasps from pressure or contact with the chain means.

The locking pin 19 shown in FIG. 3 consists of a high tinsel strength pin having a wire bail 28 that fits over the end of the pin 19 to retain it in place when inserted through square tube 22 see FIG. 5 in hole position 29–33 or when inserted through center support shield 18 (see FIG. 6) in hole position 30 or 31. The locking pin 19 is used in the center position 30 or 31 depending on the length of leaf spring 12, the same determination must be made when deciding to use hole 32 or 33 for proper placement of steel tube 22. Each pin 19 has a tensile strength of 95,000 pounds and can support the weight of the axle tube 13 when in use.

The square tube 22 shown in FIG. 5 is the main support beam of the present invention, it is approximately 42" long and about 1½"×1½" square and made of high quality steel material with a minimum thickness of about ⅛". It has five holes 29–33 measuring about 1 1/32" in diameter for insertion of the type of pin 19 shown in FIG. 3 to fit through. Hole 29 is about 3" from the end of tube 22, holes 29 and 30 are about 10" apart, holes 30 and 31 are about 1" apart, holes 31 and 32 are about 12" apart, and holes 32 and 33 are about 2" apart. Depending on the variance distance between axles, a pin will be inserted into either hole 32 or 33 when installed. Hole 29 is a fixed position and is always utilized when square tube 22 is installed. The center holes 30 and 31 of which only one is utilized based on proper positioning of the center support 18 over the axle as shown in FIG. 1.

Figure 4:
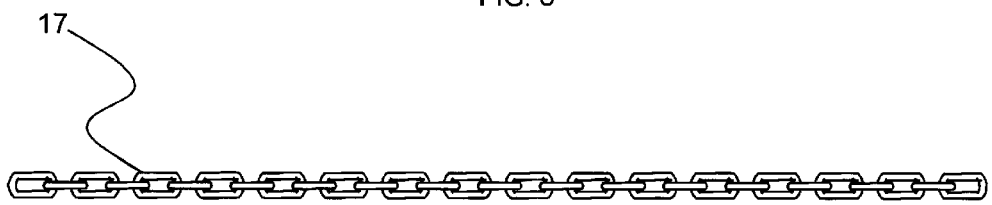
FIG. 4 shows an example of a length of the type of chain used to wrap around the axle and pinned to the square tube.

The chain 17 shown in FIG. 4 is the supporting link between the square tube 22 and axle tube 13 shown in FIG. 1. The chain 17 is made of high tensile strength steel with 5/16" diameter links and measures about 3' in length.

SUMMARY, RAMIFICATIONS, AND SCOPE

Accordingly, the reader will see that the temporary support device of this invention can be universally installed on any multiple axle trailer with leaf spring suspension, can be easily and conveniently installed and removed with very little effort and provides mobility without further damage to a disabled trailer. In addition, the present support device is portable, light weight and easily stored onboard any vehicle. Furthermore, the axle support device has the additional advantages in that

- it can be attached to any multiple axle trailer vehicle with leaf spring suspension;
- it permits immediate towing capabilities to a vehicle that would otherwise be immobile due to axle or suspension related damage or needed repairs;
- it provides a simple, yet superior, method in which to tow a disabled vehicle to a repair facility for complicated or extensive repairs with the usual towing vehicle;
- it eliminates the use of elaborate wrecking equipment to get a disabled trailer off of a hazardous highway or roadway and into a repair facility or other safe area;
- it provides towing or wrecking companies a universal and safe means to move any multiple axle trailer which is disabled due to axle, suspension, or wheel damage or damage to any associated component thereof;
- it eliminates the need for elaborate and expensive towing equipment and numerous tools to move a disabled vehicle
- the chain-like means and pins can be stored in the steel support member which makes storage a desirable and simple task.

Although the description above contains many specificities, these should not be construed as limiting the scope of the invention but as merely providing illustrations of some of the presently preferred embodiments of this invention. For example, the means by which the supported axle is attached to the Axle Crutch device can have other properties such as a chain, cable, bracket, flexible link or other type of adjustable means, etc.; the locking devices can be other types of pins, bolts, or other such securing devices, etc.

Thus the scope of the invention should be determined by the appended claims and their legal equivalents, rather than the examples given.

I claim:

1. An axle support device, comprising:

a) an elongated support member having two opposing ends, composed of rigid material and having a plurality of holes at each opposing end allowing insertion of removable pins to secure said elongated support member in place, and allowing adjustment, and, thereby to prevent excessive undesired movement of said elongated support member during use;

b) an adjustable U-shaped center support shield;

c) a plurality of removable pins securing said elongated support member between the leaf spring hangers of a multiple axle trailer during use;

d) a removable pin attaching said U-shaped center support shield to the midsection of said elongated support member;

e) a chain securing said U-shaped center support shield to the axle of a multiple axle trailer during use; and, f) a removable pin attaching said chain to said U-shaped center support member.

2. The support device of claim 1 wherein said elongated support member has a plurality of holes at the mid-section allowing insertion of said removable pin to secure said U-shaped center support shield in place, allowing for slidable adjustment, and, thereby to prevent excessive undesired movement of said U-shaped center support shield during use.

3. The support device of claim 1 wherein said U-shaped center support shield is composed of rigid material.

4. The support device of claim 3 wherein said U-shaped center support shield has an engaging end portion being slidably engaged with said elongated support member.

5. The support device of claim 3 wherein said U-shaped center support shield has a plurality of holes allowing insertion of said removable pin joining said U-shaped center support shield to said elongated support member, thereby to prevent excessive undesired movement of said U-shaped center support shield during use.

6. The support device of claim 1 wherein said U-shaped center support shield has a plurality of holes for insertion of said pin joining said U-shaped center support shield to said chain, allowing for adjustment, and thereby to prevent excessive undesired movement of said chain during use.

7. The support device of claim 1 wherein said chain has two opposing ends.

8. The support device of claim 7 wherein said chain has a plurality of links, thereby to allow for adjustment in length.

* * * * *